US012582947B2

(12) United States Patent
Hug

(10) Patent No.: US 12,582,947 B2
(45) Date of Patent: Mar. 24, 2026

(54) MIXER INSERT, STATIC MIXER AND PRODUCTION METHOD

(71) Applicant: medmix Switzerland AG, Haag (CH)

(72) Inventor: Bernhard Hug, Winterthur (CH)

(73) Assignee: medmix Switzerland AG, Haag (CH)

(*) Notice: Subject to any disclaimer, the term of this patent is extended or adjusted under 35 U.S.C. 154(b) by 828 days.

(21) Appl. No.: 17/640,264

(22) PCT Filed: Sep. 4, 2020

(86) PCT No.: PCT/EP2020/074727

§ 371 (c)(1),
(2) Date: Mar. 3, 2022

(87) PCT Pub. No.: WO2021/043960

PCT Pub. Date: Mar. 11, 2021

(65) Prior Publication Data

US 2022/0331757 A1 Oct. 20, 2022

(30) Foreign Application Priority Data

Sep. 4, 2019 (EP) .................................... 19195331

(51) Int. Cl.

| | |
|---|---|
| ***B01F 25/431*** | (2022.01) |
| *B01F 25/422* | (2022.01) |
| *B01F 35/00* | (2022.01) |
| *B01F 101/19* | (2022.01) |

(52) U.S. Cl.

CPC ...... *B01F 25/43161* (2022.01); *B01F 25/422* (2022.01); *B01F 35/561* (2022.01); *B01F 2101/19* (2022.01)

(58) Field of Classification Search

CPC ..................... B01F 25/43161; B01F 25/43162
USPC ........................................................ 366/337
See application file for complete search history.

(56) References Cited

U.S. PATENT DOCUMENTS 3,643,927 A * 2/1972 Crouch ............. B01F 25/43151 366/337
4,220,416 A * 9/1980 Brauner ............ B01F 25/43151 366/337
5,484,203 A * 1/1996 King ................. B01F 25/43151 366/337
6,394,644 B1 * 5/2002 Streiff ................. B01F 25/4313 366/337
2003/0165080 A1 9/2003 Pinyayev et al.
2012/0134232 A1 5/2012 Schneider
2022/0062835 A1 * 3/2022 Zenke ................. B01F 25/3131

FOREIGN PATENT DOCUMENTS

| | | | |
|---|---|---|---|
| CN | 102773937 | A | 11/2012 |
| DE | 102013213467 | A2 | 5/2014 |
| EP | 1815904 | A1 | 8/2007 |
| EP | 3495036 | A1 | 6/2019 |

* cited by examiner

*Primary Examiner* — David L Sorkin
(74) *Attorney, Agent, or Firm* — Spencer Fane, LLP

(57) ABSTRACT

A mixer insert for a static mixer, includes mixing elements that are arranged behind one another along a longitudinal central axis. The mixing elements have a web arrangement including a plurality of intersecting or mutually adjoining webs. The mixing elements have web arrangements that are rotated by an angle of rotation with respect to one another. The mixer insert is configured as a single-part component.

17 Claims, 8 Drawing Sheets

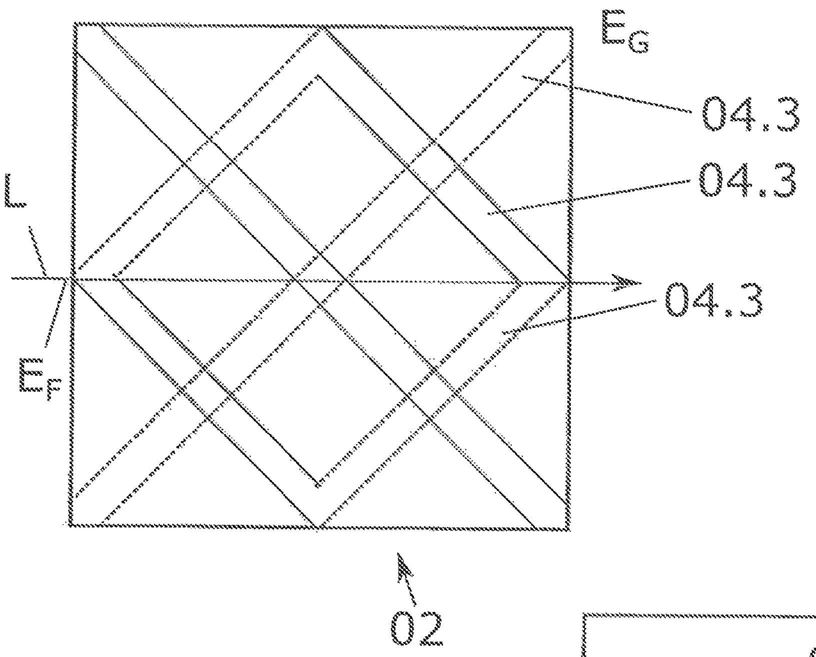
FIG. 4A
FIG. 4B
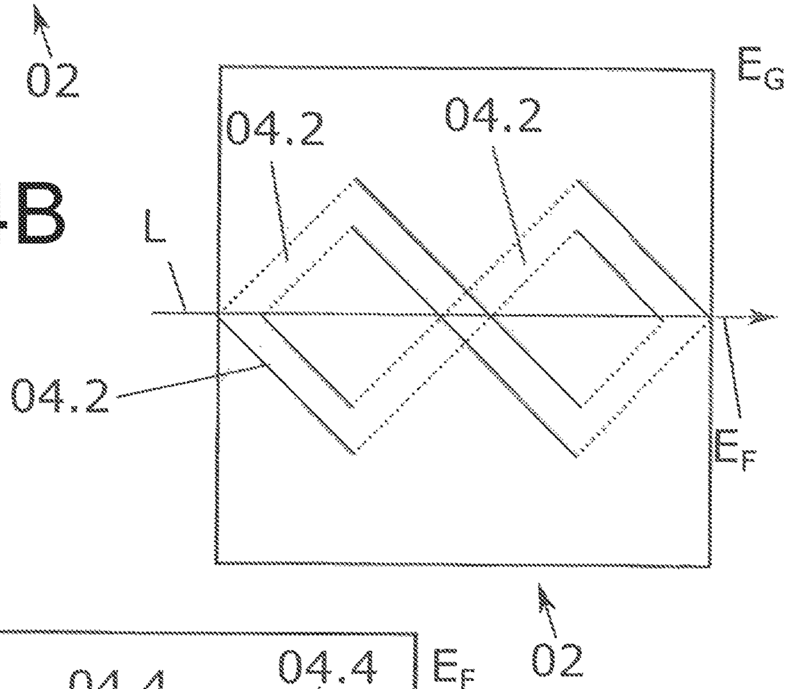
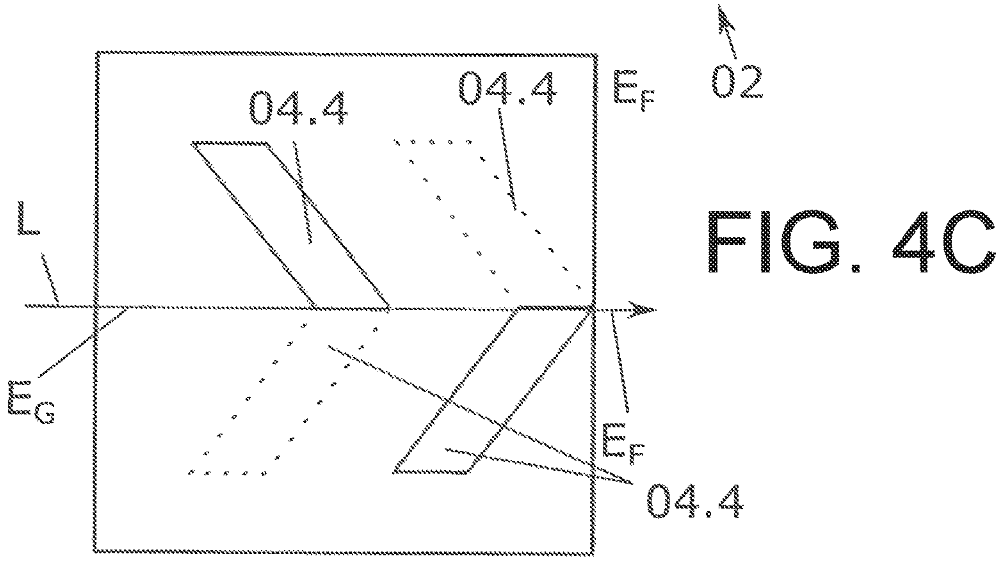
FIG. 4C

MIXER INSERT, STATIC MIXER AND PRODUCTION METHOD

CROSS-REFERENCE TO RELATED APPLICATION

This application is a U.S. National Stage application of International Application No. PCT/EP2020/074727, filed Sep. 4, 2020, which claims priority to European Patent Application No. 19195331.4, filed Sep. 4, 2019, the contents of each of which are hereby incorporated by reference.

FIELD OF THE INVENTION

The present disclosure relates to a mixer insert for a static mixer, the mixer insert comprising a plurality of mixing elements that are arranged behind one another, preferably, directly adjoining one another, along a longitudinal central axis, wherein the mixing elements have a web arrangement comprising a plurality of intersecting and/or mutually adjoining webs, wherein at least two mixing elements arranged behind one another, preferably directly behind one another, along the longitudinal central axis have web arrangements that are rotated by an angle of rotation, preferably 90°, with respect to one another and that are preferably otherwise identical.

The present disclosure further relates to a static mixer comprising a mixer insert and to a method of manufacturing a mixer insert.

BACKGROUND INFORMATION

In WO 2017/097860 A1, a mixer insert in accordance with the category for a static mixer is described that achieves a particularly good mixing performance of 2-component systems in a static mixer in that the mixing elements each comprise a plurality of intersecting webs.

SUMMARY

It has been determined that the convention mixer inserts have disadvantages. One of the disadvantages of conventional mixer inserts is that the mixer insert has to be assembled from two part mixing inserts and, accordingly, two part mixing inserts also have to be manufactured and assembled to one another or connected to one another as part of the manufacture. On the one hand, this leads to a complex and cost-intensive manufacture. On the other hand, also with regard to the reduction in size of the mixer insert, a limit is given by the stability of the part mixing inserts that can no longer be safely and reliably established from a certain size onward. In particular the demolding of the part mixing inserts as part of an injection molding process, for example as part of a plastic injection molding process, can no longer be ensured from a certain dimension onward, in particular on a falling below of a certain web dimension of the webs of the part mixing inserts.

Furthermore, other mixing inserts, in particular single-part mixing inserts, are already known from the prior art that can indeed be manufactured comparatively easily, in particular injected, but it has been determined that these mixer inserts are in need of improvement with respect to the mixing effect or with respect to the mixing efficiency and/or with respect to the pressure loss.

Against this background, it is the object of the present disclosure to provide a mixing insert for a static mixer that can be easily produced, in particular in an injection molding process, particularly preferably in a plastic injection molding process, and that is characterized by the simple producibility and simultaneously enables or provides a low flow resistance and a high mixing performance or mixing efficiency. The object of the present disadvantages further comprises providing a further developed static mixer that enables an efficient mixing with a comparatively low flow resistance and a method of manufacturing a mixer insert, for a static mixer that enables a simple and robust manufacture of an efficient mixer insert.

This object is satisfied with respect to the mixer insert having the features disclosed herein, i.e. with a mixer insert in accordance with the category in that the total mixer insert is now configured as a single-part component, preferably an injection-molded component, in particular a plastic component.

The basic idea of the present disclosure is based on the surprising realization that, with a minimal or slight deviation in the geometry of the mixing elements of the mixer insert, which in the modified form does not exclusively provide intersecting webs, but in addition to the intersecting webs also occasionally comprises webs that adjoin other webs and/or transition into other webs, the mixer insert can be manufactured in one piece, that is as a total mixer insert, with minimal losses with respect to mixing efficiency and pressure loss or with a minimal increase in the flow resistance in a comparatively simple injection molding process, in particular in a plastic injection molding process.

It is thereby achieved that both significantly smaller and more filigree mixer inserts can be produced than in the prior art, in particular while maintaining the mixing efficiency and the pressure loss. At the same time, the mixer inserts in accordance with the present disclosure can be manufactured particularly quickly, easily, and inexpensively since in particular the manual joining together of two or more part mixing inserts into a complete mixing insert is omitted.

In accordance with a first advantageous embodiment of the mixer insert in accordance with the invention, provision can be made that the web arrangement comprises a first group of webs whose longitudinal extent extends in parallel with a grid plane that comprises a longitudinal central axis of the mixer insert. The first group of webs of the web arrangement of each mixing element provides the webs that substantially form an intersecting arrangement, namely comprising points of intersection or axes of intersection that stand perpendicular to the grid plane or extend perpendicular to the grid plane.

Thus, the webs of the first group of the web arrangement contribute quite significantly to the mixing efficiency of the mixer insert with a simultaneous low pressure loss.

The webs of the first group of the web arrangement are arranged in rows, in particular in four rows, perpendicular to the longitudinal central axis and perpendicular to the grid plane. For a better descriptiveness of the structure of the webs and the web arrangement of the first group, the rows are described below with respect to a structure close to the center and a structure far from the center. Accordingly, the structure close to the center should be the rows of webs that directly adjoin the longitudinal central axis at one side. The structures far from the center should therefore be the rows of webs that adjoin the rows of the web structure close to the center at both sides perpendicular to the grid plane.

In accordance with a particularly advantageous embodiment of the mixer insert, provision can be made that the first group of webs comprises a web structure close to the center that has webs at both sides of the grid plane, with preferably the webs forming the shape of an eight lying on its side or of two rhombuses or parallelograms arranged next to one another along the longitudinal central axis, and with further preferably mutually adjoining webs each being arranged at different sides of the grid plane. The basic requirement for the overall web arrangement of the mixing element comprising a plurality of intersecting webs is thereby formed in the web structure close to the center. Accordingly, the webs of the web structure close to the center are a particularly advantageous basic shape or basic geometry for forming a mixer insert having a particularly high mixing efficiency. An integer or half-integer multiplication of the webs of the first group can also be performed in the web structure close to the center along the longitudinal axis. Three or more rhombuses arranged behind one another along the longitudinal central axis can therefore be provided or formed. Likewise, only one rhombus can, if necessary, also be formed by the webs of the web structure close to the center.

In accordance with a particularly preferred embodiment, provision can further be made that the webs of the web structure close to the center have widened portions at one or both ends, the widened portions penetrating the grid plane, to achieve a better stability of the mutually adjoining webs of the web structure close to the center.

To be able to penetrate the grid plane accordingly, the widened portions of the ends at least also extend perpendicular to the grid plane, that is in the direction of a web width of the first group of webs. It has particularly advantageously been found that such widened portions at the ends of webs indeed positively influence the stability of the mixer insert, on the one hand, but at the same time do not exert a negative influence on the single-part manufacture of the mixer insert and equally advantageously also do not exert a noticeable influence on the mixing efficiency and the pressure loss or flow resistance.

In accordance with a further particularly desirable variant of the mixer insert, provision can furthermore be made that the first group of webs comprises a web structure far from the center that has webs at both sides of the grid plane, with preferably the webs forming the shape of a cross and of a rhombus arranged concentrically with respect to the cross, with further preferably three webs being arranged at each side of the grid plane and each extending in parallel with one another.

The webs of the web structure far from the center of the grid plane also make a considerable contribution to the formation of intersecting webs and accordingly lead to a particular degree to the high mixing efficiency of the single-part mixer insert.

In an embodiment with three webs, preferably parallel webs, the web structure far from the center exhibits a point symmetry with respect to the center of the grid plane. In deviation therefrom, other embodiments, for example with more webs, could also be provided, however. For example, a duplication, performed along the longitudinal central axis and mirrored where possible, of the webs could be provided, the webs then taken together with the webs at both sides of the grid plane forming two crosses and two rhombuses arranged concentrically with respect to the crosses.

In accordance with a likewise particularly preferred embodiment of the mixer insert, provision can also be made that the webs of the web structure far from the center, which form the cross, are connected to one another and/or transition into one another at transitions of the mixing elements. If more than three webs at each side of the grid plane form the web structure far from the center, provision can also alternatively or in a corresponding generalization be made that webs that end in a corner point of the respective mixing element in each case transition into or are connected to a web of an adjacent mixing element that likewise ends in a corner point of the subsequent or preceding mixing element. In an embodiment that is as selective as possible, the connection can in this respect extend substantially to the corner or to the mutually adjoining corners of the respective mixing elements. Realistically, however, the connection or the transition of the webs of the web structure far from the center extends at least over the web height of the two webs that are connected or that transition into one another.

In accordance with a likewise preferred embodiment of the mixer insert in accordance with the invention, provision can also be made that the webs of the web structure far from the center of the grid plane, which form the rhombus or the rectangle, have a sectionally reduced width in a direction perpendicular to the grid plane, in particular in end regions that are centrally arranged in the mixing element. Due to this sectional or at least sectional reduction in the width of the webs, a reduction in the pressure loss can be achieved in a particularly advantageous manner without the mixing efficiency thereby being noticeably impaired. Similarly, the reduced width perpendicular to the grid plane can be produced without particular challenges as part of an injection molding process, in particular as part of a plastic injection molding process. Provision can also be made in a generalizing manner in modified web arrangements or web structures far from the center, for example in a web structure far from the center with more or fewer than three webs at each side of the grid plane, that one or more webs whose one-sided end regions are arranged at a margin of a mixing element centrally in the mixing element with respect to the direction of the longitudinal central axis have a reduced width at the end side in each case.

Likewise, in accordance with a further advantageous embodiment, provision can be made that the web arrangement of the mixing elements comprises a second group of webs whose longitudinal extent extends perpendicular to a leaf plane, with the leaf plane comprising a longitudinal central axis of the mixer insert and being arranged perpendicular to the grid plane.

The webs of the second group that extend along a leaf plane represent an at least partial departure from the principle of exclusively intersecting webs. The mixing efficiency and the flow resistance of the mixer insert are thereby indeed negatively impacted to a very slight degree, but this slight deviation from a web arrangement comprising exclusively intersecting webs simultaneously makes it possible that the mixer insert is manufactured or can be manufactured in one part and preferably in an injection molding process, for example in a plastic injection molding process.

In accordance with an advantageous embodiment, provision can be made that the second group of webs has a web structure arranged at an end side in the longitudinal direction of the mixing element and/or a web structure arranged centrally in the longitudinal direction of the mixing element, the web structure preferably in each case having webs at both sides of the leaf plane, with further preferably the web structure in each case forming the shape of a roof or of an angle. In the case of a provision of webs that have both a web structure arranged at the end side along the longitudinal central axis or in the longitudinal direction of the mixing element and a centrally arranged web structure, provision can particularly advantageously be made that the roof shape or the angular shape of the then two web structures are identically oriented, i.e. that the angle or the roof shape faces in the same direction and/or the webs extend in parallel, albeit possibly at different sides of the leaf plane. Furthermore, provision can also be made that more webs are included by the second group of webs. For example, zigzag lines instead of roof shapes or angular shapes can be formed by the webs. Alternatively or additionally, a plurality of webs can also be arranged along the longitudinal central axis so that more than one or two angular structures are formed.

The webs of the second group, that is the webs that extend perpendicular to the leaf plane, also contribute to the mixing efficiency of the mixer insert and likewise enable the manufacture of the mixer insert as a single-part component, preferably as part of an injection molding process.

In accordance with a further, advantageous embodiment, provision can also be made that the webs of the web structure far from the center of the grid plane, which form the rhombus or the rectangle, are connected to webs of the leaf plane arranged at the end side and/or transition into them at transitions of the mixing elements of a respective two mixing elements that are preferably arranged directly next to one another. This connection or this transition is preferably formed at the same side of the grid plane. The connection or the transition preferably extends over the total width of the web forming the rhombus or the rectangle. In a differently designed embodiment of the web structure far from the center of the grid plane, provision can be made that in each case webs that, in the longitudinal direction or along the longitudinal central axis, end at a boundary or a margin of the mixing element in the region of the grid plane are connected to webs of the leaf plane arranged at the end side and/or transition into them.

Even if a slight increase in the pressure loss is associated therewith, the transition or the connection between the webs is of particular advantage both for the mechanical stability of the mixer insert and for the manufacturability as a single-piece mixer insert as part of an injection molding process.

In a further, particularly advantageous embodiment of the mixer insert, provision can also be made that the webs of the web structure far from the center and the webs of the leaf plane have a curved surface at outer ends facing away from the longitudinal central axis, with the curvature being selected such that an oval cross-section, preferably an elliptical cross-section, particularly preferably a circular cross-section, of the total mixer insert is formed along the longitudinal central axis. The curvatures are separately, that is individually, designed such that an enveloping overall surface extent is produced that is oval, preferably elliptical, particularly preferably circular, in cross-section. Alternatively, a rectangular or a square cross-section can also be provided. The oval cross-section, preferably elliptical cross-section, particularly preferably circular cross-section, has the advantage that it can be combined together with a plurality of widely used circular mixing sleeves of known static mixers. However, since more and more static mixers have become known in the past whose mixing sleeves have a rectangular cross-section, preferably a square cross-section, in particular of the mixing sleeve, this embodiment can also be advantageous, in particular while taking into account the fact that a comparatively lower flow resistance is achieved with a rectangular or square cross-section. In the oval, elliptical, or circular design, provision can particularly advantageously be made that the other webs, web structures, and planes are formed identically to a square or rectangular cross-section.

Provision can advantageously be made that the mixer insert comprises an arrangement behind one another of 4 to 48 mixing elements, preferably 8 to 24 mixing elements. At least two mixing elements, but preferably all of the mixing elements, are each rotated by an angle of rotation, preferably 90°, with respect to the adjacent mixing element. The length of the mixer insert and/or the number of mixing elements can be varied depending on the multicomponent material to be processed and on the intended use, wherein it can generally be assumed that a more homogeneous mixing is achieved with a larger number of mixing elements than with fewer mixing elements. At the same time, however, it also applies that from a complete homogenization onward, that is a complete mixing, of the 2-component or multi-component starting materials, an additional number of mixing elements only increases the flow resistance and no longer contributes any additional mixing efficiency. Therefore, depending on the application, a corresponding selection of the number of mixing elements can be advantageous.

With respect to the static mixer for mixing multi-component material systems, in particular dental-medical multi-component material systems, the static mixer comprising a mixing sleeve, in particular having connection means or element arranged at one end for connection to a dispensing apparatus of the multi-component material system and dispensing means or element arranged at the other end, preferably a dispensing nozzle or a dispensing opening, the initially mentioned object is satisfied in that a mixer insert in accordance with the kind described above is received in the mixing sleeve. A static mixer can thereby be provided that simultaneously has a particularly high mixing efficiency and can be manufactured in a particularly simple and uncomplicated manner and thus also at low cost.

With respect to the method in accordance with an embodiment of the invention of manufacturing a mixer insert in accordance with the above description, the object is satisfied in that the mixer insert is produced by a single injection molding process, in particular in a plastic injection molding process, preferably by a jaw tool comprising two sliders arranged perpendicular to a main molding direction. This enables the complex web structure of the mixer insert described above to be manufactured as part of a single injection molding process, in which the jaws of the jaw tool are first closed, then the sliders are inserted into the jaw tool perpendicular to the main molding direction of the mixer insert, subsequently the injection molding tool or the injection mold is ejected, and the completely injected mixer insert is demolded from the opened jaw tool, in particular by a lateral demolding, after the withdrawal or removal of the sliders and the opening of the jaws of the jaw tool.

BRIEF DESCRIPTION OF THE FIGURES

The invention will be explainer in more detail hereinafter with reference to the drawings.

FIGS. 4A-4C show a highly schematized representation of individual web structures of a mixer insert in accordance with the invention in accordance with a first embodiment;

DETAILED DESCRIPTION

Figure 1:
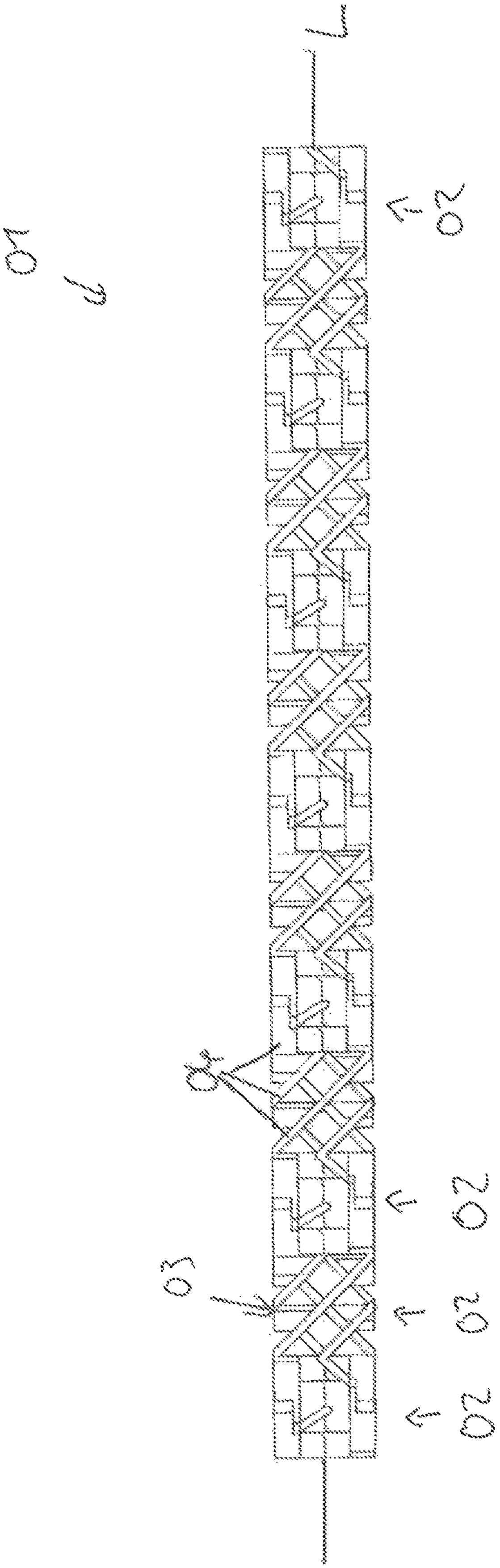
FIG. 1 is a mixer insert in accordance with the disclosure in a plan view in a first embodiment.

FIG. 1 shows a plan view of a mixer insert 01 in accordance with the invention, for a static mixer, comprising a plurality of mixing elements 02 that are arranged behind one another along a longitudinal central axis L, and indeed directly adjoining one another. The mixing elements 02 comprise a web arrangement 03 comprising a plurality of intersecting and/or mutually adjoining webs 04. In the example of FIG. 1, the mixer insert 01 comprises thirteen mixing elements 02 arranged directly adjoining one another. However, more, in particular up to 48, mixing elements can also be provided in a mixer insert formed in one piece. Alternatively, fewer mixing elements can also be provided. The adjacent mixing elements are each rotated by 90° with respect to one another, whereby an alternating view of individual mixing elements 02 can be recognized in the representation selected in FIG. 1. The mixer insert 01 is overall formed in one part, wherein the web arrangements 03 of the mixing elements 02 of two mixing elements, preferably of all the mixing elements arranged behind one another along the longitudinal axis, are rotated by an angle of rotation, preferably 90°, with respect to one another and are otherwise designed with an identical web arrangement. A particular advantage of the mixer insert 01 in accordance with FIG. 1 is the fact that it is configured as a single-piece injection-molded component, in particular as a single-piece plastic injection-molded component, and can be produced by a simple, single-stage injection molding process in the embodiment shown in FIG. 1. In this respect, the web arrangements of the respective mixing elements per se and due to the arrangement of the respective consecutive mixing elements 02 rotated or turned with respect to one another provide a particularly good and efficient mixing as part of a static mixing process.

Figure 2:
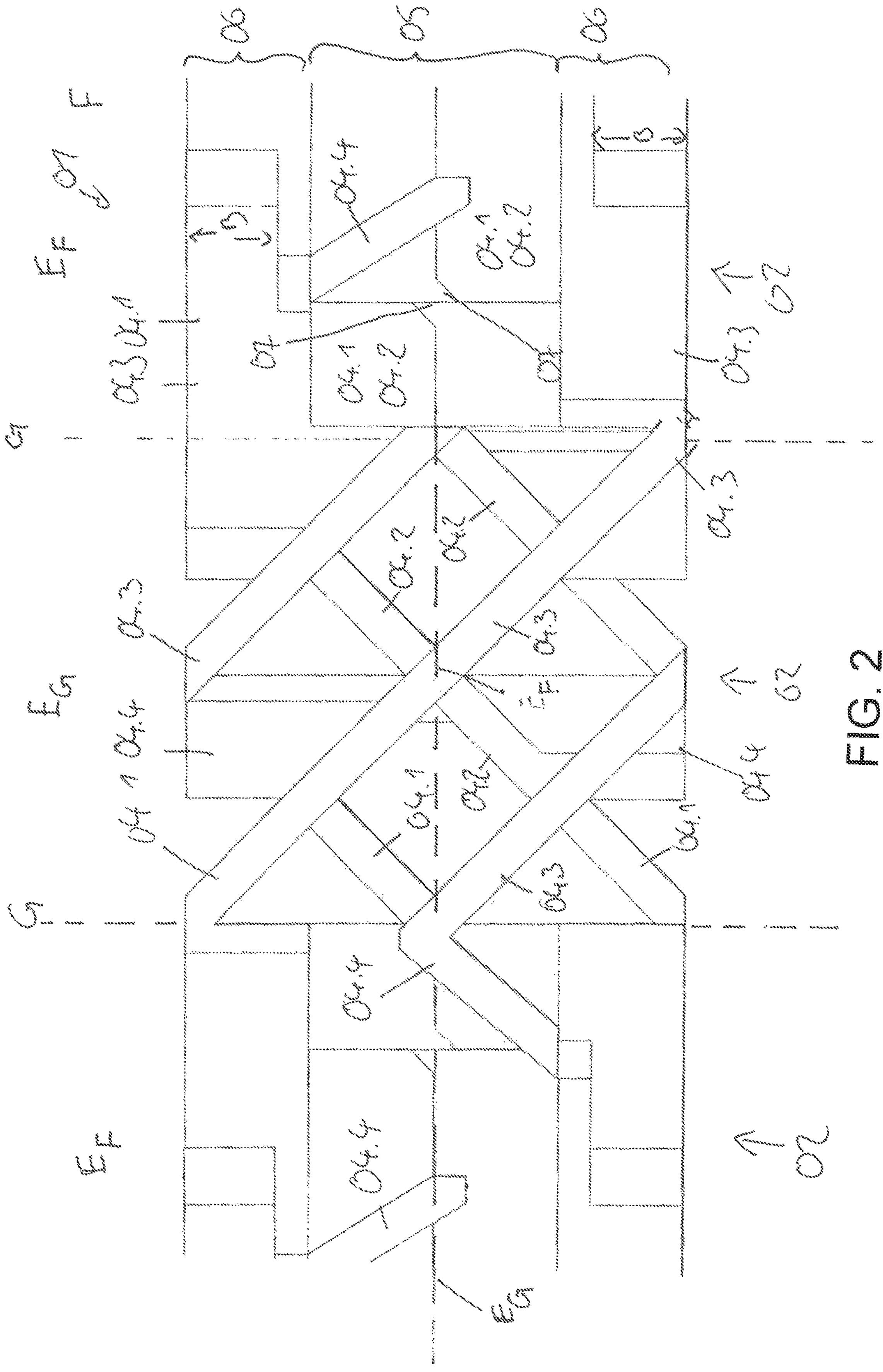
FIG. 2 is an enlarged section of the mixer insert in a plan view in accordance with FIG. 1.

FIG. 2 shows a section of a mixer insert 01 in accordance with the embodiment of FIG. 1. The boundaries G between mutually adjoining mixing elements 02 are marked even more clearly therein. In FIG. 2, a mixing element 02 is shown in the central region and it can be seen from the mixing element 02 that the majority of the webs 04 extending along the plane of representation form webs 04 that intersect perpendicular to the plane of representation. The webs 04.1 are to be associated with the first group of webs, wherein the grid plane $E_G$, in particular the grid plane $E_G$ of the central mixing element in accordance with FIG. 2, then extends in parallel with the plane of representation of FIG. 2 and moreover comprises the longitudinal central axis, not shown in FIG. 2, of the mixer insert. As will be explained in more detail with reference to subsequent Figures, the first group of webs 04.1 comprises a web structure close to the center that has webs 04.2 at both sides of the grid plane $E_G$, with preferably the webs 04.2 forming the shape of an eight lying on its side or of two rhombuses or parallelograms arranged next to one another along the longitudinal central axis, and with, further preferably, mutually adjoining webs 04.2 each being arranged at different sides of the grid plane.

Furthermore, the first group of webs 04.1 comprises a web structure far from the center whose webs 04.3 are arranged at both sides of the grid plane, and with the webs 04.3 preferably forming the shape of a cross and of a rhombus or rectangle arranged concentrically with respect to the cross, with, further preferably, three webs 04.3 being arranged at each side of the grid plane $E_G$ and each extending in parallel with one another. In the example of FIG. 2, the three parallel webs 04.3 can be recognized at this side of the grid plane $E_G$. The webs 04.3 arranged at the other side of the grid plane $E_G$ are concealed by the webs 04.3 and webs of the leaf plane due to the selection of the representation perspective with the drawing plane in parallel with the grid plane $E_G$.

The outer mixing elements 02 in the representation of FIG. 2 are thus rotated by 90° with respect to the central mixing element 02 such that the viewing direction here extends in parallel with a leaf plane $E_F$ that is perpendicular to the grid plane $E_G$ of the mixing elements and likewise comprises the longitudinal central axis of the mixer insert. In the view in which the leaf plane $E_F$ extends in parallel with the drawing plane for the outer mixing elements 02, both properties of the first group of webs 04.1 and features and properties of the second group of webs 04.4 can be recognized.

On the one hand, it can be seen that the webs 04.1 of the first group form a total of four rows of which the two inner rows form the web structure 05 close to the center, with the outwardly disposed webs forming the web structure 06 far from the center. It can be seen that the webs 04.2 of the web structure 05 close to the center have widened portions 07 at the ends, the widened portions 07 penetrating the grid plane $E_G$ and improving the stability of the mutually adjoining webs. It can likewise be seen that the webs 04.1 of the first group, which are associated with the web structure 06 far from the center, have a width B that is sectionally reduced in a direction perpendicular to the grid plane $E_G$, in particular in end regions of the webs 04.3 that are centrally arranged in the mixing element 02.

It can also be seen from FIG. 2 that the webs 04.3 of the web structure 06 far from the center, which form the cross, are connected to one another at the transitions or boundaries G of the mixing elements 02. In this respect, the connection extends approximately over a height H of the webs 04.3 of the web structure 06 far from the center. As shown in FIG. 2, the connection or the transition between the webs 04.3 can also be smaller than the height H of the corresponding webs 04.3.

Likewise, between the central mixing element 02 and the left mixing element 02, it can also be seen within the framework of the representation of FIG. 2 that the webs 04.3 of the web structure 06 far from the center, which form the eight lying on its side, the rhombuses or parallelograms arranged next to one another, transition into or are connected to webs 04.4 whose longitudinal extents extend substantially perpendicular to the leaf plane $E_F$.

In the central mixing element 02, it can also be seen that the webs 04.4 of the second group of webs, namely the webs that extend perpendicular to the leaf plane $E_F$, transition into the webs 04.1, 04.2 of the grid plane or are connected to one another in the region of the web structure 05 close to the center.

Accordingly, in the perspective representation of FIG. 3, three mixing elements 02 are likewise shown at least in part, wherein the properties, which were already explained with reference to FIG. 2, become more comprehensible again with reference to FIG. 3, for which purpose FIG. 3 has the same reference numerals as FIG. 2. On the one hand, the webs 04.3 of the web structure far from the center that are arranged at both sides of the grid plane and the transition of the webs 04.3 at the boundary or at the transition of the mixing elements 02, on the one hand, and into webs 04.4 perpendicular to the leaf plane can be recognized. The webs 04.2 of the web structure 05 close to the center are somewhat less easily recognizable and moreover transition into or are connected to the webs 04.4 perpendicular to the leaf plane and furthermore have the widened portions 07.

Based on the representation of FIG. 4A-FIG. 4C, the shape of the webs of the first group and the shape of the webs of the second group are again also explained by way of example with reference to a simplified representation in which in each case the representation of some of the webs, in particular a representation of some of the webs of the respective other group, is omitted.

In the representation of FIG. 4A, only the webs 04.2 of the web structure 05 close to the center are shown in a representation analogous to the central mixing element of FIG. 2, i.e. in a view in which the grid plane $E_G$ extends in parallel with the plane of representation. In this respect, webs 04.2 that are arranged at one side of the grid plane $E_G$ are shown with solid lines and webs 04.2 that are arranged at the oppositely disposed side of the grid plane $E_G$ are shown with dotted lines. In the representation of FIG. 4A and FIG. 4B, the leaf plane $E_F$ extends perpendicular to the plane of representation and comprises the longitudinal central axis L. As can be seen therefrom, the webs 04.2 form, in each case in an alternating arrangement with respect to the grid plane $E_G$, an eight lying on its side or two rhombuses arranged next to one another in the direction of the longitudinal central axis L of the mixing element 02.

In the representation of FIG. 4B, which corresponds to the representation of FIG. 4A in terms of the representation perspective, only the webs 04.3 of the web structure 06 far from the center of the first group of webs 04.1 are shown. Here, too, analogously to FIG. 4A, the webs at one side of the grid plane $E_G$ are shown solid, whereas webs 04.3 at the oppositely disposed side of the grid plane $E_G$ are shown with dotted contours. In the exemplary representation of FIG. 4B, it can be seen that the webs 04.3 form a cross, on the one hand, with the respective webs 04.3 being arranged at different sides of the grid plane. Similarly, it can be seen that the remaining webs 04.3 form a rhombus formed concentrically with respect to the cross, wherein the webs 04.3 are likewise arranged at different sides of the grid plane $E_G$ to form the contour of the rhombus.

Finally, in the representation of FIG. 4C, a simplified or filtered view is shown in which only the webs 4.4 of the second group of webs are shown. The selection of the view or representation is chosen such that the drawing plane coincides with the leaf plane E or extends in parallel with the leaf plane $E_F$. In the representation of FIG. 4C, analogously to the representation of FIG. 4A and FIG. 4B, webs that are arranged at the one side of the leaf plane $E_F$ are shown with solid contours, whereas webs 4.4 that are arranged at the oppositely disposed side of the leaf plane $E_F$ are shown with dotted contours. Based on the representation of FIG. 4C, it can be relatively easily understood that the webs 04.4 of the second group comprise a web structure arranged at an end side in the longitudinal direction L of the mixing element 02 and a web structure arranged centrally in the longitudinal direction L of the mixing element 02, the web structure in each case comprising webs 04.4 at both sides of the leaf plane $E_F$, with preferably the web structure in each case forming the shape of a roof or of an angle. As can be seen in FIG. 4, the angular structures are identically oriented.

Figure 5:
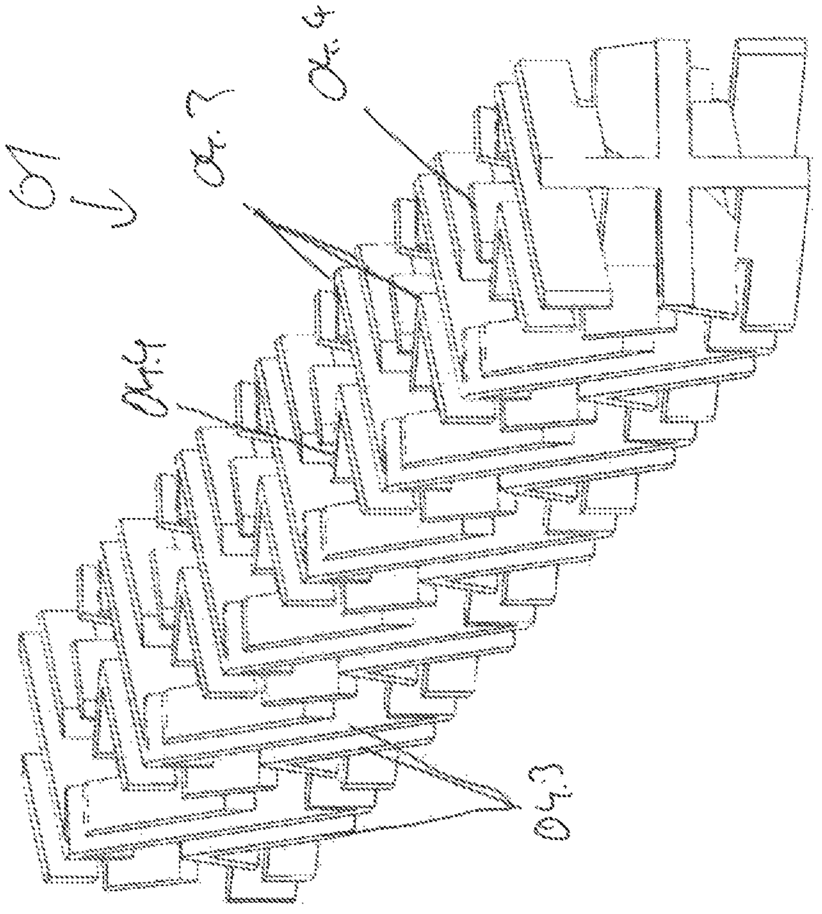
FIG. 5 is a perspective representation of a mixer insert in accordance with the invention in accordance with a first embodiment.

A mixer insert 01 in accordance with the first embodiment is again shown in FIG. 5. The webs 04.3 of the web structure far from the center of the webs 04.1 of the first group can also be particularly easily recognized in the perspective representation of FIG. 5. Furthermore, the webs 04.4 of the second group of webs can also be clearly recognized. It is also shown that the total mixer insert 01 has a rectangular cross-sectional shape, in particular a square cross-sectional shape.

Figure 6:
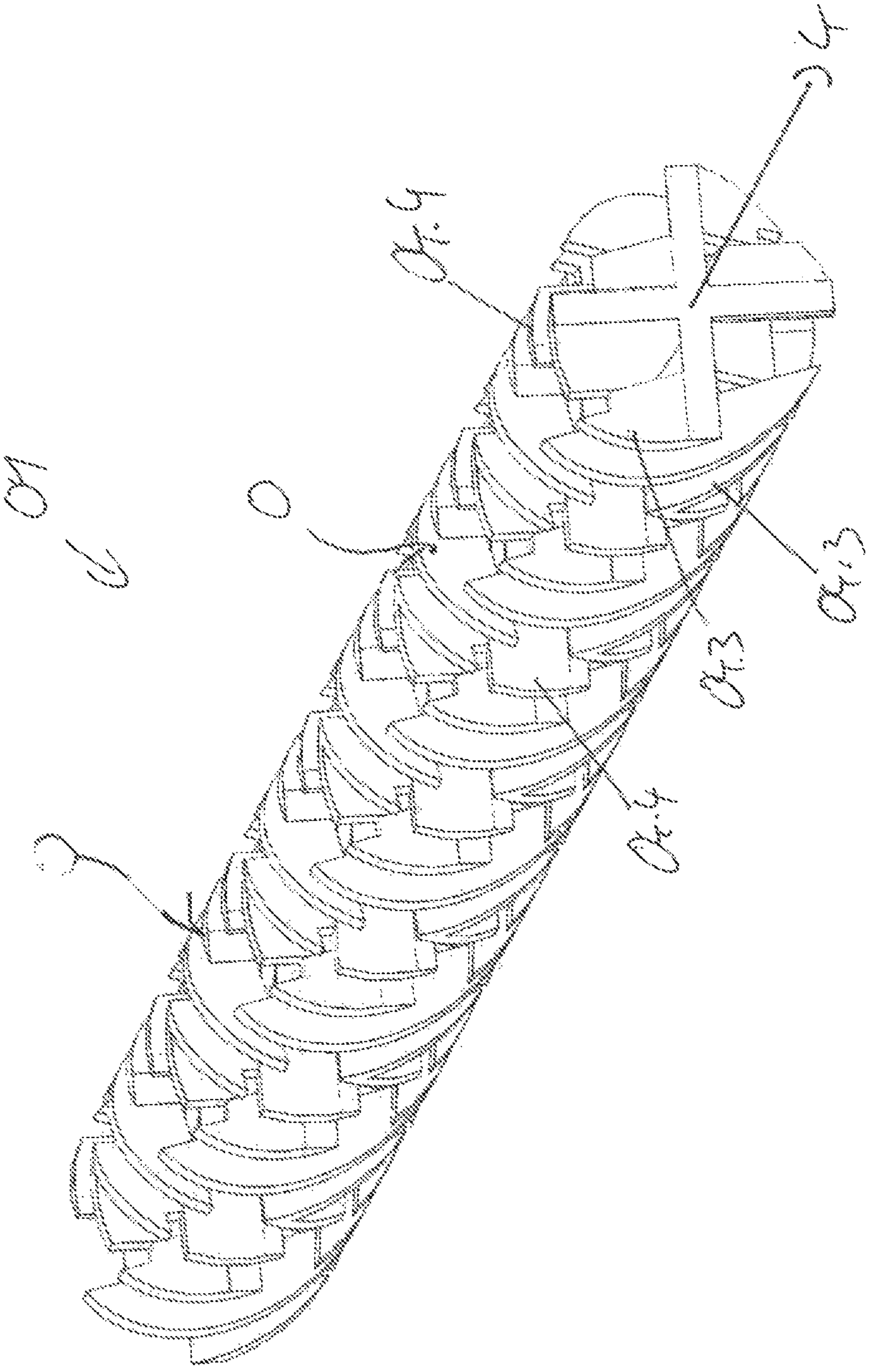
FIG. 6 is a perspective representation of a mixer insert in accordance with the invention in accordance with a second embodiment.

An alternative embodiment of a mixer insert 01 can be seen from FIG. 6 in which the webs 04.3 of the web structure far from the center and the webs 04.4 of the leaf plane have a curved surface O at the outer ends facing away from the longitudinal central axis L, with the curvature being selected such that a cross-section, for example a circular cross-section, of the mixer insert 01 is achieved along the longitudinal central axis L. Otherwise, the arrangement and orientation of the webs 04.1 to 04.4 correspond to the systematics of the first embodiment. Only the transitions of the central webs of the web structure 04.3 far from the center are omitted due to the rounding or curvature of the outer ends of the webs.

Figure 7:
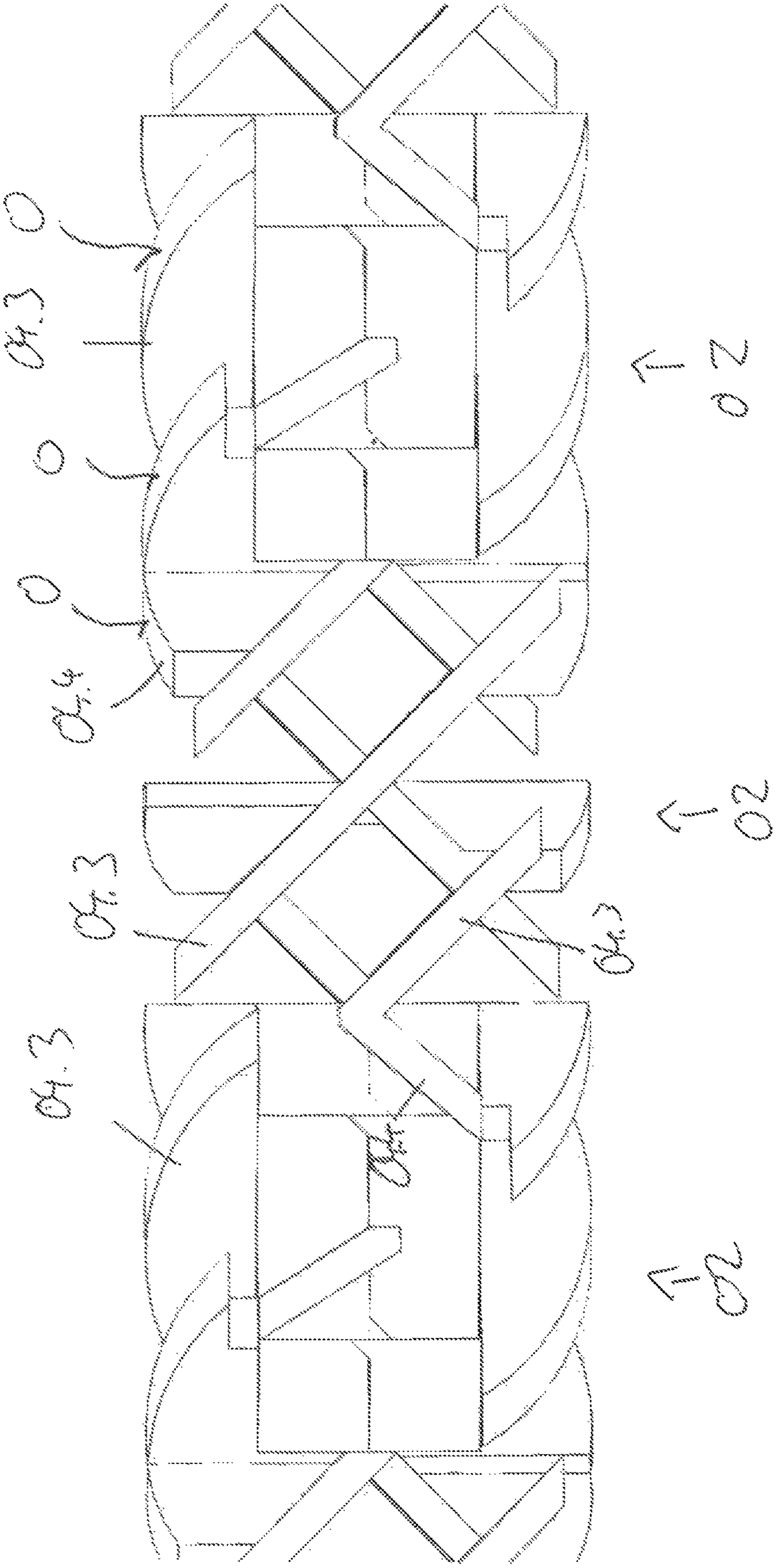
FIG. 7 is a section of the mixer insert in accordance with FIG. 6 in an enlarged plan view.

The fact that the connection or the transition, as shown in FIG. 2, is not present in the circular design of the total surface or of the cross-section of the mixer insert 01, as shown in 6, can also be easily seen with reference to the detailed representation of FIG. 7 that substantially corresponds to the representation perspective and the arrangement of the mixing elements in accordance with FIG. 2. It can be seen that the transition between the webs 04.3 and the webs 04.4 arranged at the end side in the adjoining mixing elements 02 is maintained, whereas the transition between the central webs 04.3 and the central webs 04.3 of the adjoining or next mixing element 02 is omitted due to the rounding or curvature of the surface or web ends. However, it can equally be seen that there is substantial agreement with the embodiment of FIGS. 1 to 4, in particular with respect to the arrangement of the webs per se and also with respect to the design of the webs 04.1 to 04.4.

Figure 3:
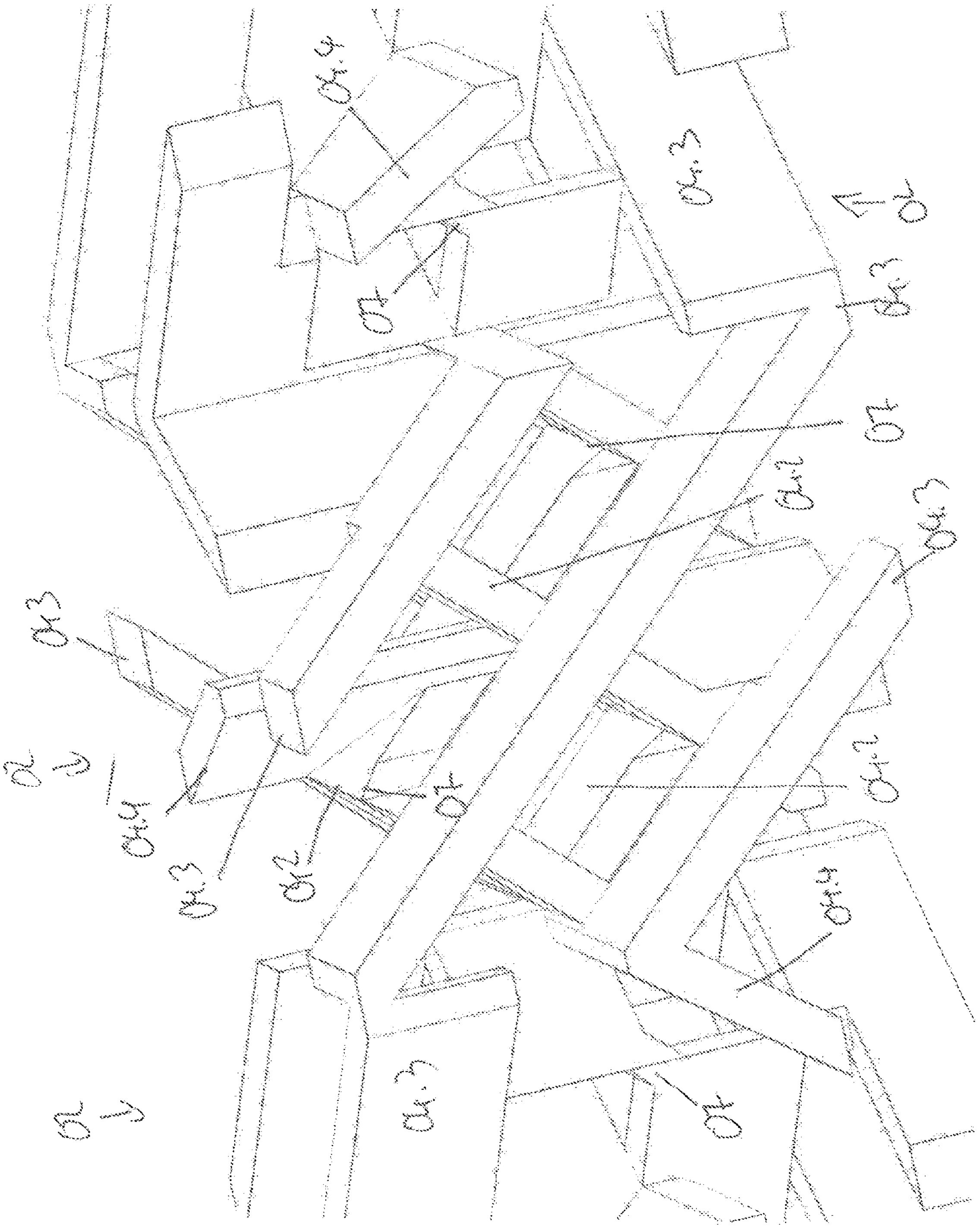
FIG. 3 is a perspective view of the enlarged section in accordance with FIG. 2.
Figure 8:
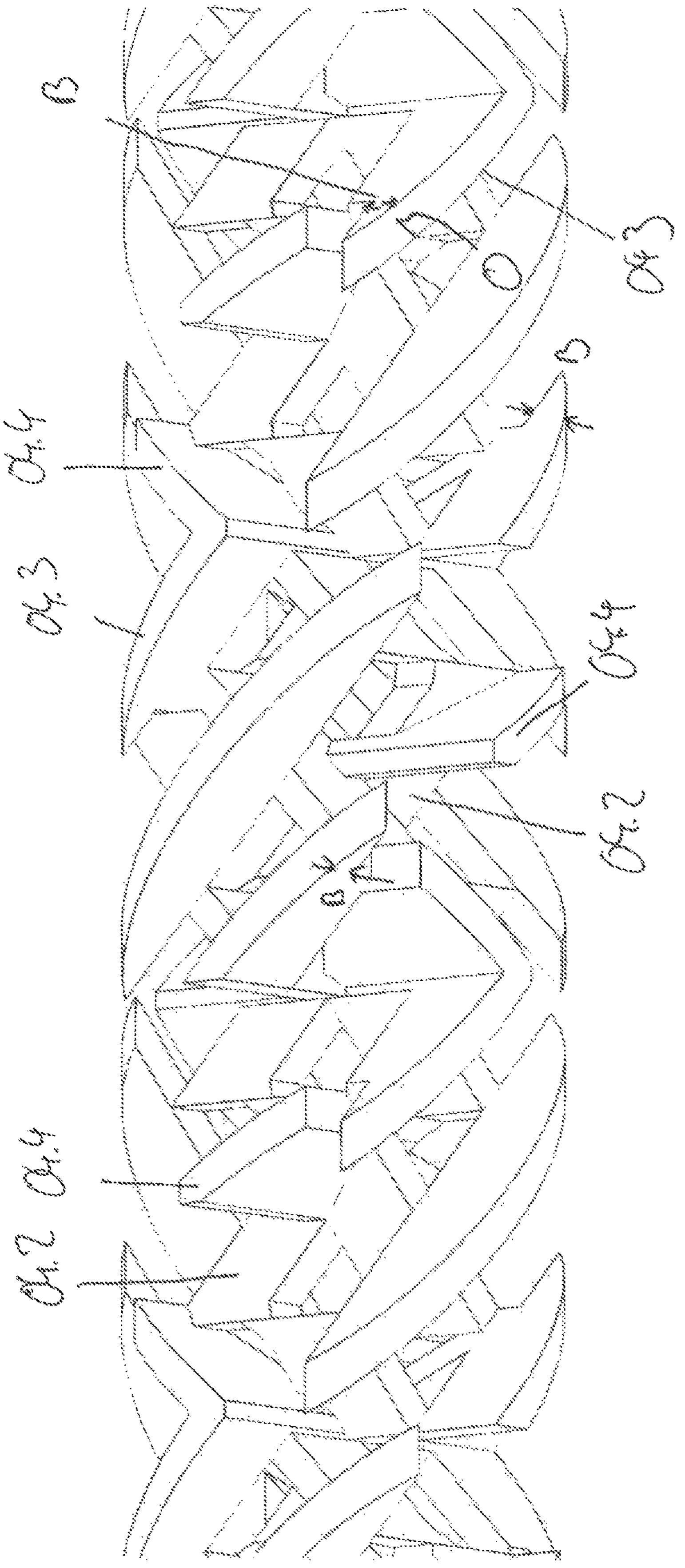
FIG. 8 is a perspective representation of the enlarged section in accordance with FIG. 5.

For the sake of completeness, a perspective representation of the embodiment of FIGS. 6 and 7, which is similar to FIG. 3 in the selection of the view, is shown in FIG. 8. The features of the webs 04.1 to 04.4 can also be seen from FIG. 7 even if the perspective representation of FIG. 8 makes the representation appear comparatively complex. However, what is still worth mentioning with respect to FIG. 7 is the fact that the reduced width B of the webs 04.3 of the web structure 06 far from the center is not constant, as can be seen in FIG. 2, but steadily decreases due to the curved surface O and is tapered towards a pointed end of the web. However, the transitions between the webs 04.3 and the webs 04.4 are also recognizable in other respects. Similarly, the transitions between the webs 04.4 and the webs 04.2 close to the center are recognizable.

In the embodiments of FIGS. 1 to 8, 90° angles of the intersecting webs are provided in each case. However, this is not absolutely necessary. In a correspondingly modified design of the webs and web arrangements, larger or smaller intersecting angles can also be implemented.

The invention claimed is:

1. A mixer insert for a static mixer, the mixer insert comprising:

a plurality of mixing elements arranged behind one another along a longitudinal central axis, each of the mixing elements having a web arrangement comprising a plurality of intersecting or mutually adjoining webs, at least two mixing elements of the plurality of mixing elements being arranged behind one another along the longitudinal central axis have web arrangements that are rotated by an angle of rotation with respect to one another, a first group of the mutually adjoining webs of the web arrangement have a longitudinal extent extending in parallel with a grid plane that comprises the longitudinal central axis of the mixer insert, the first group of the mutually adjoining webs comprising a web structure close to a center that has webs at both sides of the grid plane with the webs forming a shape of an eight lying on a side or of two rhombuses or parallelograms arranged next to one another along the longitudinal central axis, and mutually adjoining webs each being arranged at different sides of the grid plane, and the mixer insert configured as a single-part component.

2. A mixer insert for a static mixer, the mixer insert comprising:

a plurality of mixing elements arranged behind one another along a longitudinal central axis, each of the mixing elements having a web arrangement comprising a plurality of intersecting or mutually adjoining webs, at least two mixing elements of the plurality of mixing elements being arranged behind one another along the longitudinal central axis have web arrangements that are rotated by an angle of rotation with respect to one another, the mixer insert configured as a single-part component, a first group of the mutually adjoining webs of the web arrangement have a longitudinal extent extending in parallel with a grid plane that comprises the longitudinal central axis of the mixer insert, the first group of the mutually adjoining webs comprising a web structure close to a center that has webs at both sides of the grid plane, the webs of the web structure close to the center having widened portions at one or both ends, the widened portions penetrating the grid plane configured to stabilize the mutually adjoining webs of the web structure close to the center.

3. The mixer insert in accordance with claim 1, wherein the first group of the mutually adjoining webs comprises a web structure far from a center that has webs at both sides of the grid plane.

4. The mixer insert in accordance with claim 3, wherein the webs of the mutually adjoining web structure far from the center form a cross, and are connected to one another or transition into one another at transitions of the mixer elements.

5. The mixer insert in accordance with claim 3, wherein the webs of the mutually adjoining web structure far from the center of the grid plane form a rhombus or a rectangle, and have a sectionally reduced width in a direction perpendicular to the grid plane.

6. The mixer insert in accordance with claim 1, wherein a second group of webs of the web arrangement have a longitudinal extent extending perpendicular to a leaf plane that comprises a longitudinal central axis of the mixer insert and that is arranged perpendicular to the grid plane.

7. The mixer insert in accordance with claim 6, wherein the second group of the mutually adjoining webs has a web structure arranged at an end side in a longitudinal direction of the mixing element or a web structure arranged centrally in the longitudinal direction of the mixing element.

8. The mixer insert in accordance with claim 3, wherein a second group of the mutually adjoining webs of the web arrangement has a longitudinal extent extending perpendicular to a leaf plane that comprises a longitudinal central axis of the mixer insert and that is arranged perpendicular to the grid plane, the second group of the mutually adjoining webs has a web structure arranged at an end side in a longitudinal direction of the mixing element or a web structure arranged centrally in the longitudinal direction of the mixing element, and the webs of the web structure far from the center of the grid plane form a rhombus or a rectangle, and are connected to the second group of the mutually adjoining webs at the end side or transition into the second group of the mutually adjoining webs at transitions of the mixing elements.

9. The mixer insert in accordance with claim 7, wherein a first group of the mutually adjoining webs of the web arrangement have a longitudinal extent extending in parallel with a grid plane that comprises the longitudinal central axis of the mixer insert, the first group of the mutually adjoining webs comprising a web structure far from a center that has webs at both sides of the grid plane, and the second group of webs of the web structure arranged centrally in the longitudinal direction of the mixing element is connected to the webs of the web structure close to the center of the grid plane or transition into the webs of the web structure close to the center of the grid plane.

10. The mixer insert in accordance with claim 3, wherein a second group of webs of the web arrangement have a longitudinal extent extending perpendicular to a leaf plane that comprises a longitudinal central axis of the mixer insert and that is arranged perpendicular to the grid plane the webs of the web structure far from the center and the second group of have a curved surface at outer ends facing away from the longitudinal central axis, with the curvatures being having an oval cross-section.

11. A static mixer for mixing multi-component material systems, the static mixer comprising:

a mixing sleeve; and the mixer insert in accordance with claim 1 configured to be received in the mixing sleeve.

12. A method of manufacturing a mixer insert in accordance with claim 1, comprising:

producing the mixer insert by a single injection molding process.

13. The mixer insert in accordance with claim 1, wherein the first group of the mutually adjoining webs comprises a web structure far from a center that has webs at both sides of the grid plane forming the shape of a cross and of a rhombus or rectangle arranged concentrically with respect to the cross with three webs being arranged at each side of the grid plane and each extending in parallel with one another.

14. The mixer insert in accordance with claim 3, wherein the webs of the mutually adjoining web structure far from the center of the grid plane form a rhombus or a rectangle, and have a sectionally reduced width in a direction perpendicular to the grid plane in end regions that are centrally arranged in the mixing element.

15. The mixer insert in accordance with claim 6, wherein the second group of the mutually adjoining webs has a web structure arranged at an end side in a longitudinal direction of the mixing element or a web structure arranged centrally in the longitudinal direction of the mixing element the web structure having webs at both sides of the leaf plane with the web structure forming the shape of a roof or of an angle.

16. The mixer insert in accordance with claim 3, wherein a second group of webs of the web arrangement have a longitudinal extent extending perpendicular to a leaf plane that comprises a longitudinal central axis of the mixer insert and that is arranged perpendicular to the grid plane the webs of the web structure far from the center and the second group of have a curved surface at outer ends facing away from the longitudinal central axis, with the curvatures having elliptical cross-section or a circular cross-section.

17. A static mixer for mixing multi-component material systems, the static mixer comprising:

a mixing sleeve having a connection device arranged at one end to connect to a dispensing apparatus of the multi-component material system and a dispensing device arranged at an other end; and the mixer insert in accordance with claim 1 configured to be received in the mixing sleeve.

* * * * *